Figure 6:
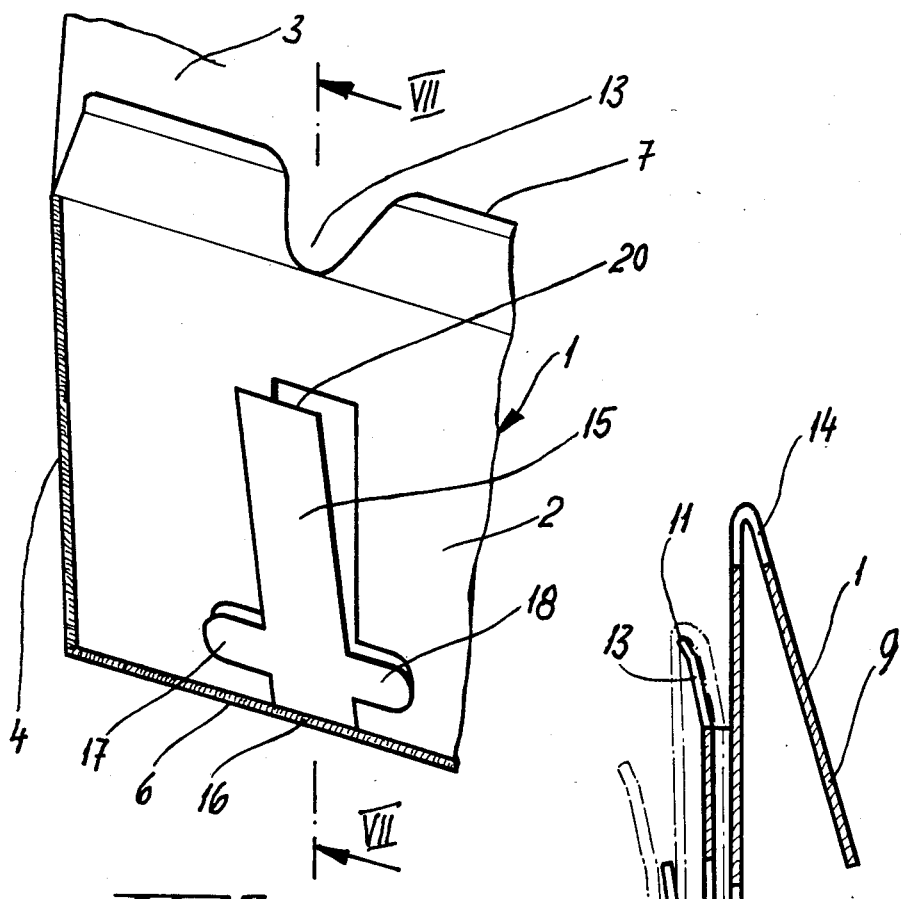

United States Patent [19]

Schweinsberg

[11] Patent Number: 4,589,544

[45] Date of Patent: May 20, 1986

[54] ARRANGEMENT FOR FILING AND STORAGE OF FLAT-SHAPED ARTICLES

[75] Inventor: Dieter Schweinsberg, Lautertal, Fed. Rep. of Germany

[73] Assignee: Datox Organisation D. Schweinsberg GmbH & Co. KG, Rödental, Fed. Rep. of Germany

[21] Appl. No.: 596,408

[22] Filed: Apr. 3, 1984

[30] Foreign Application Priority Data

Apr. 28, 1983 [DE] Fed. Rep. of Germany ... 8312485[U]

[51] Int. Cl.⁴ ............................................. B65D 27/10
[52] U.S. Cl. ...................................... 206/45; 206/425; 229/1.5 R
[58] Field of Search ..................... 229/1.5 R; 206/425, 206/44 B, 45

[56] References Cited

U.S. PATENT DOCUMENTS

Re. 30,624  5/1981  Soulakis et al. ..................... 206/425
737,232  8/1903  Heeley et al. ...................... 206/425
916,206  3/1909  Shedd ............................. 229/1.5 R
1,106,396  8/1914  McDonald ....................... 229/1.5 R
1,929,615  10/1933  Tanner ................................. 206/45
4,444,314  4/1984  Jacobsson .......................... 206/425

Primary Examiner—Stephen P. Garbe
Attorney, Agent, or Firm—Max Fogiel

[57] ABSTRACT

An arrangement for filing and storing flat-shaped articles in the form of sheets or film, especially flat information media, such as diskettes, microfilms, audio recordings, photographs, and file cards, for example. Pocket-shaped folders are ranked one after another in any desired number to accommodate the articles to be stored. The folders are connected together or are inserted one into another, so that each folder is laterally secured in relation to the folder immediately in front of it, and is retained so that it can be displaced upward by a predetermined amount. Each folder, except for the frontmost folder, has a tongue on the front that engages a hole in the back of the folder immediately in front of it.

8 Claims, 7 Drawing Figures

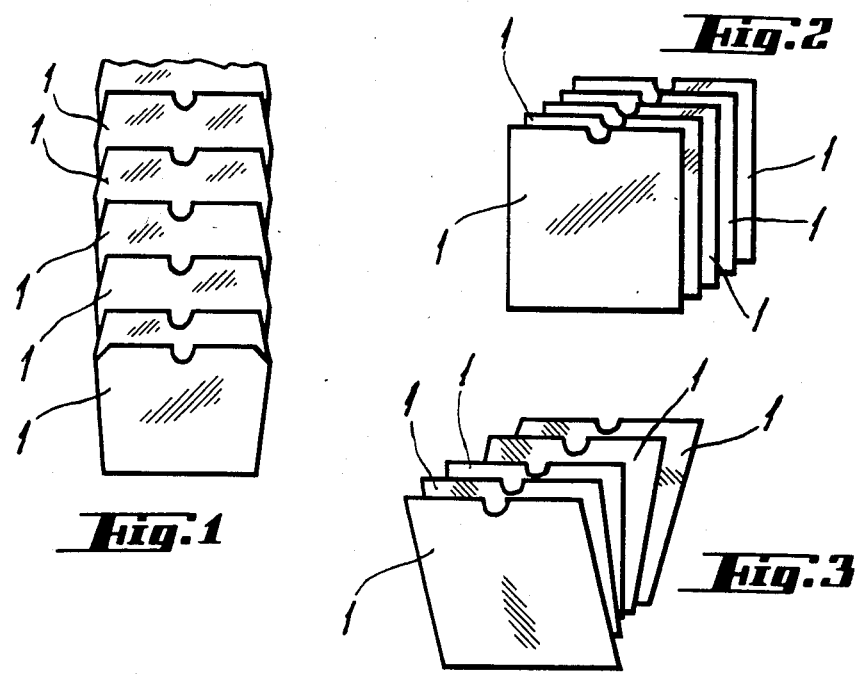
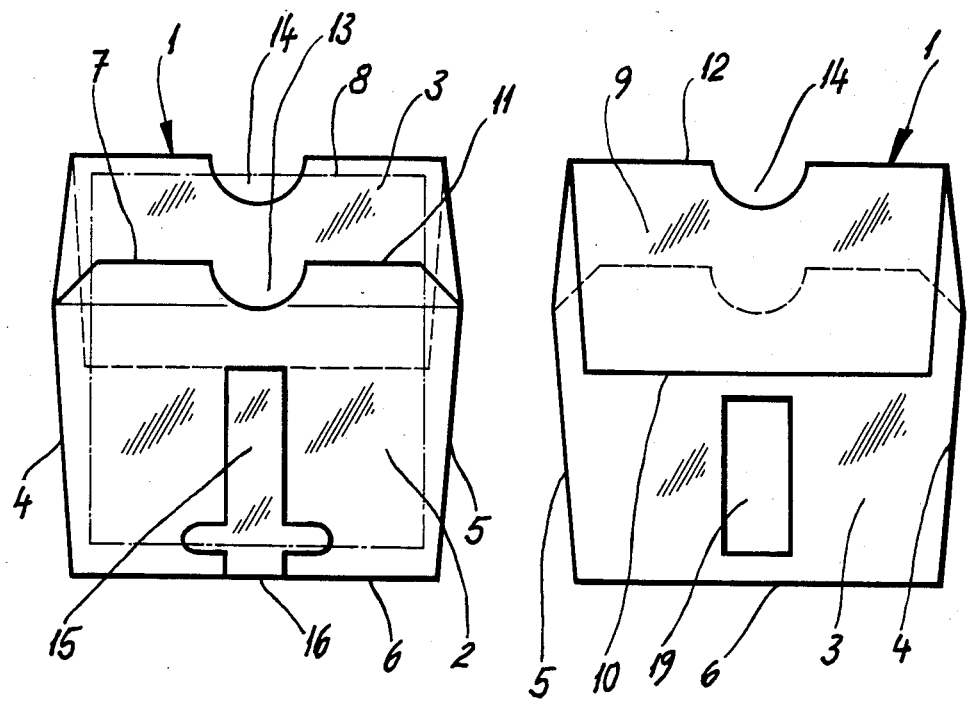

U.S. Patent May 20, 1986 Sheet 2 of 2 4,589,544

ARRANGEMENT FOR FILING AND STORAGE OF FLAT-SHAPED ARTICLES

The invention concerns an arrangement for filing and storage of flat-shaped articles or articles in the form of sheets or film, especially flat information media, like diskettes, microfilms, audio recordings, photographs, file cards etc.

Storing flat articles, especially flat information media like the diskettes employed in data processing for example in folders and protecting them from deleterious environmental action is known. The individual folders are variously organized and accommodated. On the one hand the individual folders can be accommodated in a file cabinet in what is called expansion filing, in which they are successively ranked in a straight line. This type of filing makes it difficult to locate a particular folder. The worker usually has to transport the whole file to his work station. Although another type of filing called fan filing, in which the individual folders can be spread open like a fan, makes it easier to locate a particular folder, the capacity of the system is somewhat limited. Finally, a type of filing in which the folders overlap for viewing is known. In this case the individual folders or pockets are arranged in an overlapping stack so that the particular information media can be rapidly located. This type of storage, however, also has only a limited capacity and the number of folders is prescribed.

Since each type of known file has, in addition to advantages, a number of serious drawbacks, they can be employed to advantage only in particular cases.

The object of the present invention is accordingly to provide a system of the aforesaid type that not only combines the advantages of the known types of filing but also eliminates their specific advantages. The object of the invention is also to be considered a storage and filing system for flat articles that ensures reliable storage and rapid location of the articles, that has a capacity that can be expanded as desired, that can be adapted to particular needs, and that is easy to create and manage.

This object is attained in accordance with the invention by means of the characteristics of the body of claim 1, with practical and advanced developments relating to attaining the object being found in the subsidiary claims.

The filing system in accordance with the invention involves pocket-like folders that are arranged in sequence in any desired and expandable number as necessary for the particular purpose and connected together and/or inserted one into another. The connection between the individual folders has been designed so that the folders are laterally secured in relation to each other and can be extracted upward to a certain extent. Thus, the individual folders exist first in the form of an expanding file with the capacity for being spread open in a fan. When the rearmost folder is pulled up it slides up against the folder just in front of it to a certain extent until it comes to rest against a stop. As it continues to be pulled up, the adjacent folder begins to be pulled up to the same extent in turn entrains the subsequent folder etc. until all the folders are in the form of an overlapping file and any article or information medium being sought can easily be extracted. In accordance with another characteristic of the invention, handling or viewing notches or viewing recesses are provided in a practical way so that the information media being sought can be immediately recognized and removed.

The filing system in accordance with the invention accordingly makes it possible to connect as many folders together as is necessary for particular information processes, so that the worker will not have to transport a large number of unneeded folders to his work station but only as many as he needs. The system also adapts to particular types of organization in that it can be employed as an expanding file, a fan file, or an overlapping file. The individual folders are connected in such a way that they can always be separated upwards into a stack as aforesaid but without coming apart, continuing to constitute a unit in any position. The information media inside the folders do not themselves shift when the folders are pulled apart or pushed back together but remain securely in storage.

Figure 7:
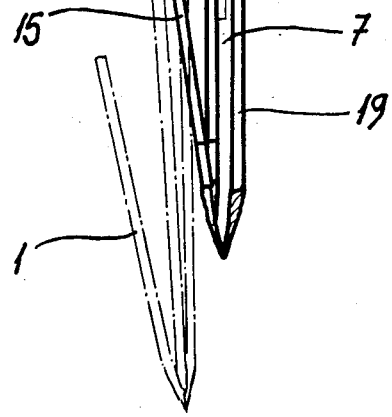

A preferred embodiment of the invention will now be described with reference to the attached drawings, wherein FIG. 1 is a front view of the system in the extended state with the connected folders overlapping one another, FIG. 2 is a schematic perspective view of the system in the collapsed state in the form of an expanding file, FIG. 3 is a schematic perspective view of the system in the fanned-open state, FIG. 4 is a larger-scale front view of an individual folder, FIG. 5 illustrates the back of the folder, FIG. 6 is a truncated schematic perspective view of an individual folder, and FIG. 7 is a lateral section along the line VII—VII in FIG. 6 of two connected folders.

The arrangement for filing and storage of flat-shaped information media, the diskettes employed in electronic data processing for example, consists of a number of individual folders 1 arranged one after another and connected together or inserted one into another. Individual folders 1 are connected in such a way that they are always adjacent but can be displaced upward in relation to each other to a certain extent. When the rearmost individual folder 1 is pulled up, it will, once it has been displaced to a certain extent, entrain the folder immediately in front of it, which will in turn entrain the one immediately in front of it etc. until all the folders with the information media inside them overlap one another as illustrated in FIG. 1. In the collapsed state illustrated in FIG. 2, individual folders 1 represent an expanding file, although it is also possible to spread open the folders in the form of a fan file as illustrated in FIG. 3. The connected individual folders 1 can accordingly be arranged in the form of an expanding file with the individual folders constituting a unit and accommodating associated information media. The particular information medium needed can easily be located and removed after individual folders 1 have been spread open or pulled up.

The design of individual folders 1 and how they are connected will be evident from FIGS. 4 through 7. Folders 1 consist essentially of a front 2 and a back 3, with a sheet-like material, particularly plastic, being employed. Front 2 is securely fastened, especially welded, to back 3 at sides 4 and 5 and at bottom edge 6 to form a pocket 7 for accommodating an information carrier 8, indicated by the dot-and-dash line in FIG. 4, or similar article between front 2 and back 3.

The back 3 of individual folder 1 extends up beyond front 2 and is folded back and down 180° at a line 12 of fold to form a flap 9. Pocket 7 tapers down gradually in such a way as to be more or less trapezoidal, and back 3 tapers gradually toward the free end 10 of flap 9. Handling or viewing recesses 13 and 14 are positioned in the middle of both the upper edge 11 of pocket 7 and of the line 12 of fold, which forms the upper edge of back 3. Pocket 7 is otherwise shaped in the vicinity of its upper edge 11 in such a way that the vicinity of the edge will be at a slight distance from back 3, creating an expanded opening in the pocket to facilitate the insertion of information carrier 8.

A tongue 15 is stamped out of the front 2 of folder 1 but with its lower edge 16 continuous with the rest of the front. Tongue 15, which is easy to bend forward, will be particularly evident from FIG. 6. Tongue 15 has two lateral opposing tabs 17 and 18 at the bottom, in the vicinity that is of its lower edge 16, that are in one piece with the tongue and are stamped out of front 2 along with it. Tongue 15 is, except for tabs 17 and 18, essentially rectangular as will be directly evident from the figures. There is a rectangular opening 19 oriented parallel to tongue 15 in the back 3 of individual folder 1. Opening 19 starts at some distance from the bottom edge 6 of individual folder 1 and ends below the free end 20 of tongue 15. Opening 19 is accordingly slightly lower and slightly wider than tongue 15.

Individual folders 1 are connected by inserting the tongue 15 on the front 2 of one folder into the opening 19 in the immediately preceding folder in such a way that tabs 17 and 18 slip into and engage the back 3 of the folder. The flap 9 of the frontmost folder simultaneously engages the pocket 7 of the second folder in such a way that the front 2 of the second folder is gripped by the flap 9 and back 3 of the front folder. Individual folders 1 are in this way arranged next to each other in a straight line, meaning that they can not be mutually displaced laterally although they can be mutually displaced vertically. Lateral tabs 17 and 18 and flap 9, however, constitute stops that limit the vertical displacement of the folders. Thus, when they are pulled up, they are pulled up in stages in such a way that handling or viewing recesses 13 are aligned with the handling or viewing recesses 14 of the preceding folder.

As previously described in detail herein, each pocket-like individual folder 1 has one tongue 15, one opening 19, and one folded-over flap 9. It is practical for the frontmost folder to lack a tongue and the rearmost folder to lack a flap, although opening 19 can also be lacking. The filing system consisting of individual folders 1, which forms a unit, can be expanded at any time by addition other folders at either end or in the middle and adapted to particular needs. The flexibility of tongue 15 and of tabs 17 and 18 makes it possible to easily spread open the system like a fan.

I claim:

1. Arrangement for filing and storage of flat-shaped articles or articles in form of sheets or film, particularly flat information media, in form of diskettes, microfilms, audio recordings, photographs, and file cards, a plurality of pocket-like folders ranked one after another in any desired number to accommodate the articles; said folders having front members and back members and being connected together by side edges so that each folder is laterally secured in relation to the folder immediately in front of it and retained to be displaceable upward to a predetermined extent; each folder except for the frontmost folder, having a tongue on the front member that engages a hole in the back member of the folder immediately in front of it; each back member having a hole engaged by the tongue of the folder immediately in rear of the back member with said hole; each folder except for the rearmost folder having a back member with a flap that is fold 180° back and down and slips into and engages the folder immediately behind it, said flap encompassing together with its respective back member the front of the folder immediately behind it; said flap guiding adjacent folders along sides of the folders, said folders being displaceable relative to each other by being guided on sides by said flap, said tongue having means engaging said hole for limiting relative displacement of folders in height direction.

2. Arrangement as defined in claim 1, wherein said means on each tongue comprises two lateral tabs located opposite to each other and engaging the back member of the folder immediately in front to prevent said immediate folder in front from moving to the side but allowing said immediate folder in front to slide up and down.

3. Arrangement as defined in claim 1, wherein said folders have an opening for receiving said articles, said folders being widest at the opening into the folder and taper gradually down and up to a free end of said flap.

4. Arrangement as defined in claim 1, wherein said front member has an upper edge with recess means for handling and viewing, said recess means being on a line of fold between the back member and said flap, said recess means in the front member of a folder that is immediately behind another folder being aligned with the recess means in the back member and flap of the folder that is immediately in front of it when the folder that is behind is pulled up.

5. Arrangement as defined in claim 1, wherein said tongue is stamped out of the front member of the folder, said tongue having a lower edge continuously connected to the rest of the folder.

6. Arrangement as defined in claim 1, wherein each tongue is longer than said hole, each hole being at least as wide as the tongue.

7. Arrangement as defined in claim 1, wherein the back member of each folder is higher than the front member.

8. Arrangement as defined in claim 1, wherein said folders are comprised of plastic material, the front member and back member of each folder being welded together at sides and bottom of the folder.

* * * * *